ём
United States Patent
Wang

(10) Patent No.: US 6,279,605 B1
(45) Date of Patent: Aug. 28, 2001

(54) WATER STOPPING SEAT OF CERAMIC CONTROL VALVE OF FAUCET

(76) Inventor: Shih-Ming Wang, No. 110, Hsiao-Yang Rd., Chang Hua City (TW)

( * ) Notice: Subject to any disclaimer, the term of this patent is extended or adjusted under 35 U.S.C. 154(b) by 0 days.

(21) Appl. No.: 09/610,207

(22) Filed: Jul. 5, 2000

(51) Int. Cl.[7] .................................................. F16K 25/00
(52) U.S. Cl. ................................... 137/454.6; 137/454.5; 137/625.28; 137/625.31; 251/208
(58) Field of Search .............................. 137/454.5, 454.6, 137/625.31, 625.28; 251/208

(56) References Cited

U.S. PATENT DOCUMENTS

| | | | |
|---|---|---|---|
| 4,924,903 | * 5/1990 | Orlandi | 137/454.5 |
| 5,082,241 | * 1/1992 | Orlandi | 137/454.5 |
| 5,174,324 | * 12/1992 | Chrysler | 137/315 |

* cited by examiner

Primary Examiner—John Rivell
Assistant Examiner—Thomas L. McShane
(74) Attorney, Agent, or Firm—Harrison & Egbert

(57) ABSTRACT

A ceramic control valve of a faucet including a water stopping seat which is provided in the periphery thereof with a retaining edge. The water stopping seat is disposed in a floating fashion in the cylindrical valve body of the ceramic control valve such that the retaining edge of the water stopping seat is retained in an annular recess of the cylindrical valve body. The service life spans of the washers of the stationary valve block of the ceramic control valve and the circular surface of the faucet are thus prolonged.

1 Claim, 7 Drawing Sheets

WATER STOPPING SEAT OF CERAMIC CONTROL VALVE OF FAUCET

BACKGROUND OF THE INVENTION

1. Field of the Invention

The present invention relates generally to a ceramic control valve, and more particularly to a water stopping seat of the ceramic control valve.

2. Description of Related Art

As shown in FIGS. 1–3, a conventional faucet 10 has a receiving portion 11, a fastening chamber 12, a handle 13, and a ceramic control valve 20 disposed in the fastening chamber 12 such that the ceramic control valve 20 is actuated by the handle 13.

The ceramic control valve 20 comprises a cylindrical body 21, a water outlet 22, an annular edge 23, a threaded section 24, a washer 25, an axial hole 26, a stop rib 27, a press edge 28, and a locating slot 29.

A rotary shaft 30 is provided with two water stopping rings 31, a protruded shoulder portion 32, a circular 33, and a moving rib 34.

A rotary valve block 35 is provided with an insertion slot 36 corresponding in location to the moving rib 34, a rotary slide surface 37, and a guide slot 38.

A stationary valve block 39 is provided with an opening 40, and a locating rib 41 corresponding in location to the locating slot 29 of the cylindrical body 21.

A pressure rotary member 42 is provided with a wing portion 44 and a retaining surface 45.

A water stopping pad 46 is provided with a through hole 47, an annular groove 48, and a plurality of annular projections 49.

The conventional ceramic control valve 20 is fastened in the fastening chamber 12 of the faucet 10 by a pneumatic tool such that the water stopping pad 46 of the ceramic control valve 20 can not be easily located, and the rotary valve block 35 and the stationary valve block 39 are often jammed. In order to overcome the deficiencies described above, a conventional water stopping seat 50 is used in place of the water stopping pad 46. The water stopping seat 50 is formed of two o-rings 51 and 52, which are disposed in the cylindrical body 21 of the ceramic control valve 20, as shown in FIGS. 3 and 4. The water stopping seat 50 is provided with an annular protruded edge 53, which is engaged with the cylindrical body 21. An o-rings 54 is disposed in the cylindrical body 21. These o rings are susceptible to water leakage which undermines the effectiveness of the ceramic control valve 20.

A BRIEF SUMMARY OF THE INVENTION

The primary objective of the present invention is to provide a ceramic control valve of the faucet with a water stopping seat which is provided in the periphery thereof with a retaining edge. The water stopping seat is disposed in the cylindrical body of the ceramic control valve such that the retaining edge of the water stopping seat is retained in an annular recess of the cylindrical body.

The features and advantages of the present invention will be readily understood upon a thoughtful deliberation of the following detailed description of a preferred embodiment of the present invention with reference to the accompanying drawings.

DETAILED DESCRIPTION OF THE INVENTION

Figure 1:
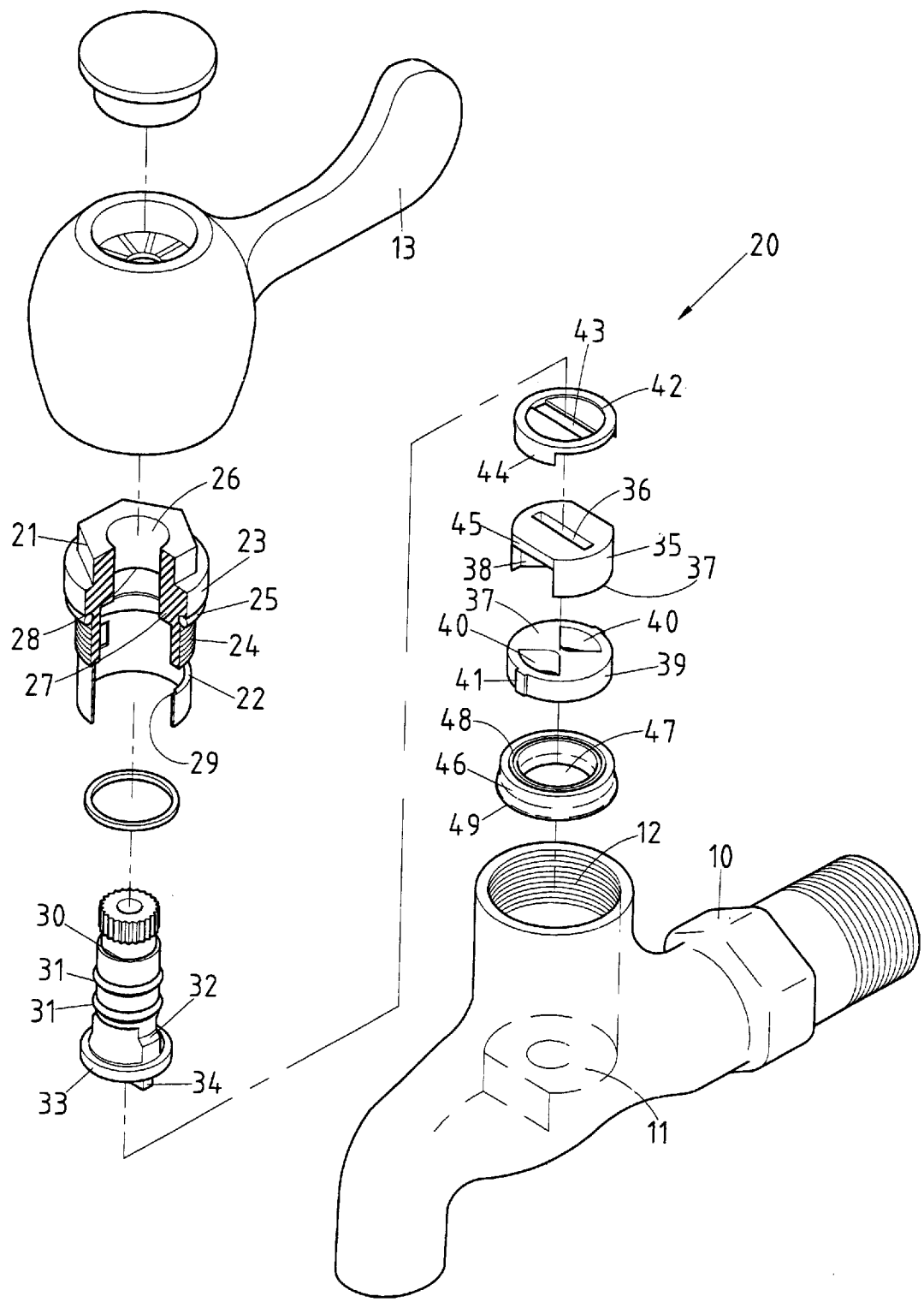
FIG. 1 shows an exploded view of a ceramic control valve of the prior art.
Figure 2:
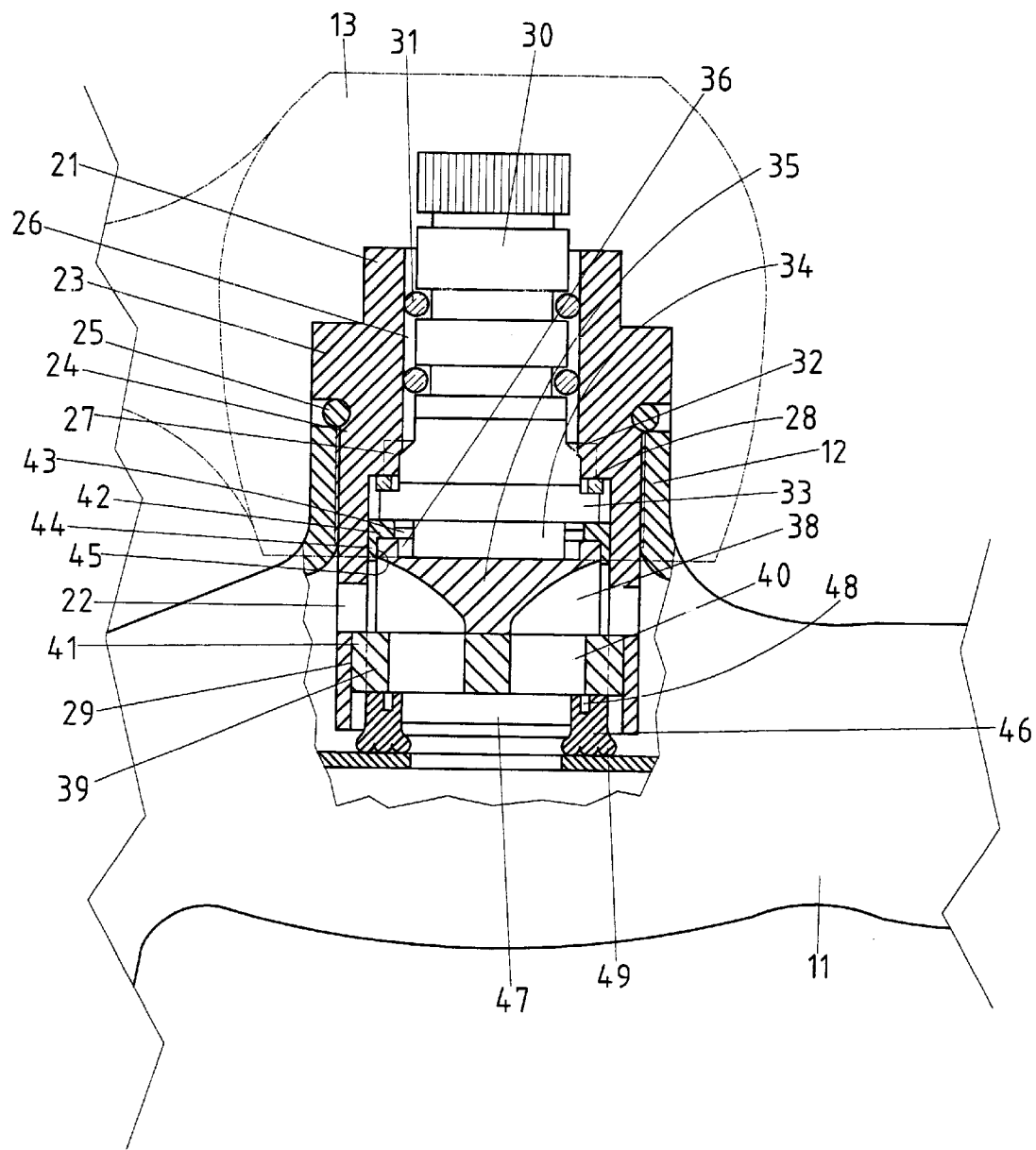
FIG. 2 shows a sectional view of the prior art ceramic control valve.
Figure 3:
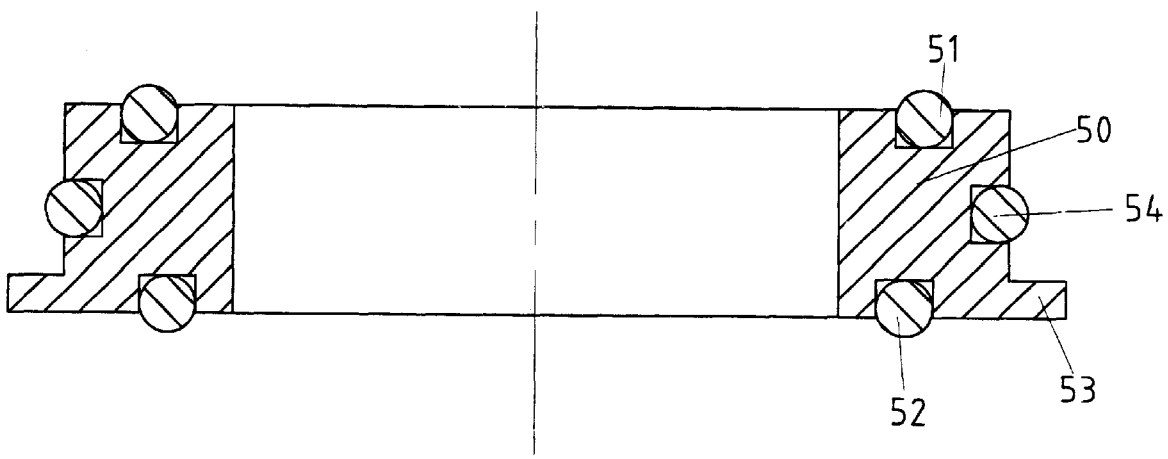
FIG. 3 shows a sectional view of a water stopping seat of the prior art.
Figure 4:
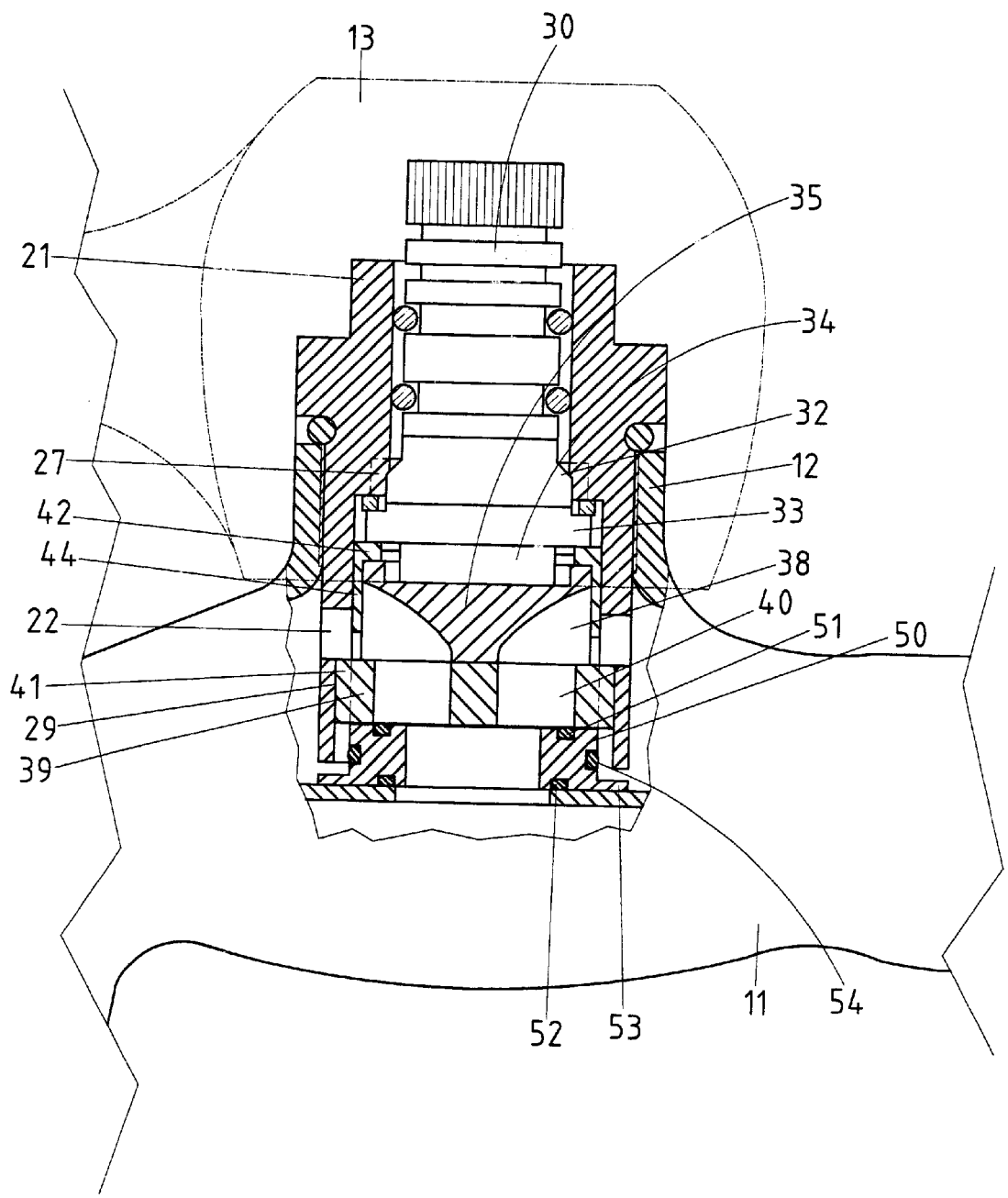
FIG. 4 shows a sectional view of the prior art water stopping seat in use.
Figure 5:
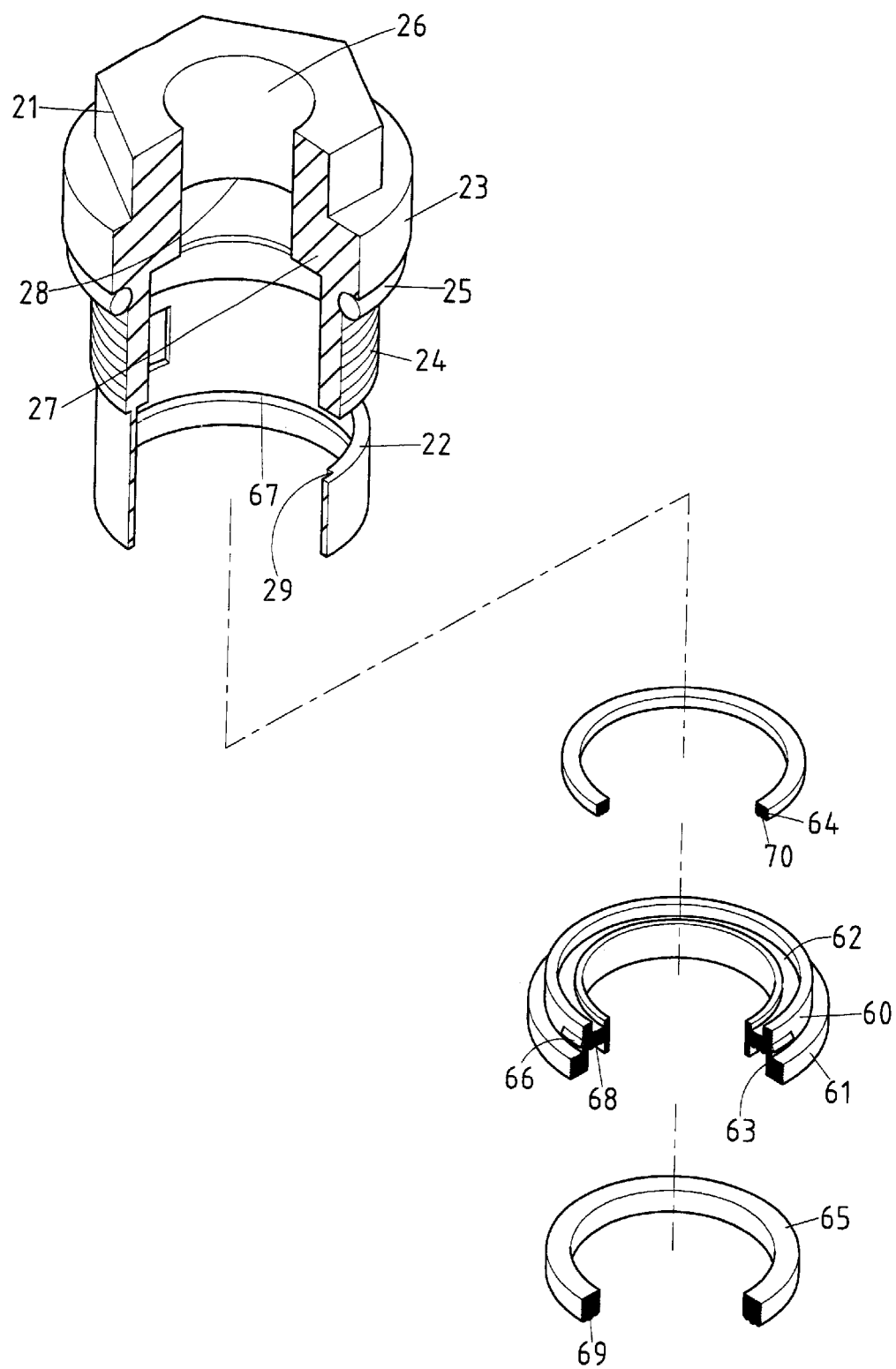
FIG. 5 shows an exploded view of a water stopping seat of the preferred embodiment of the present invention.
Figure 6:
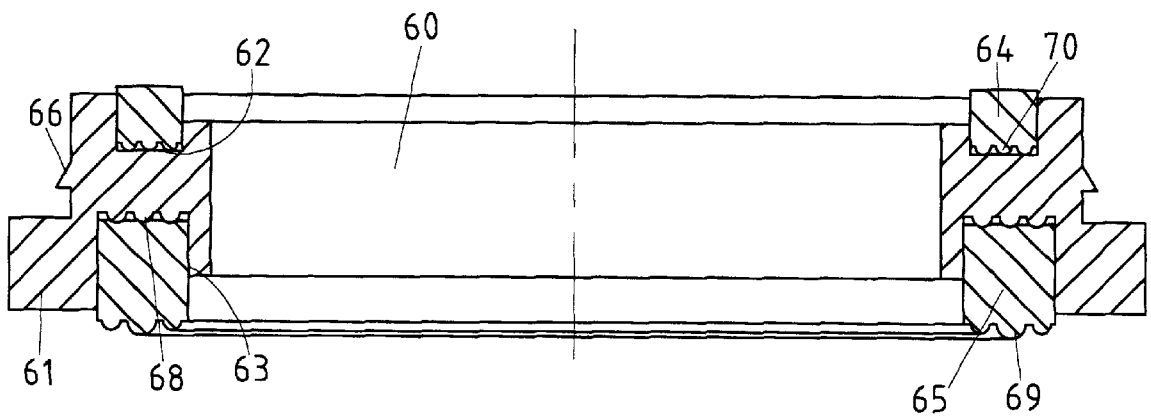
FIG. 6 shows a sectional view of the water stopping seat of the preferred embodiment of the present invention.
Figure 7:
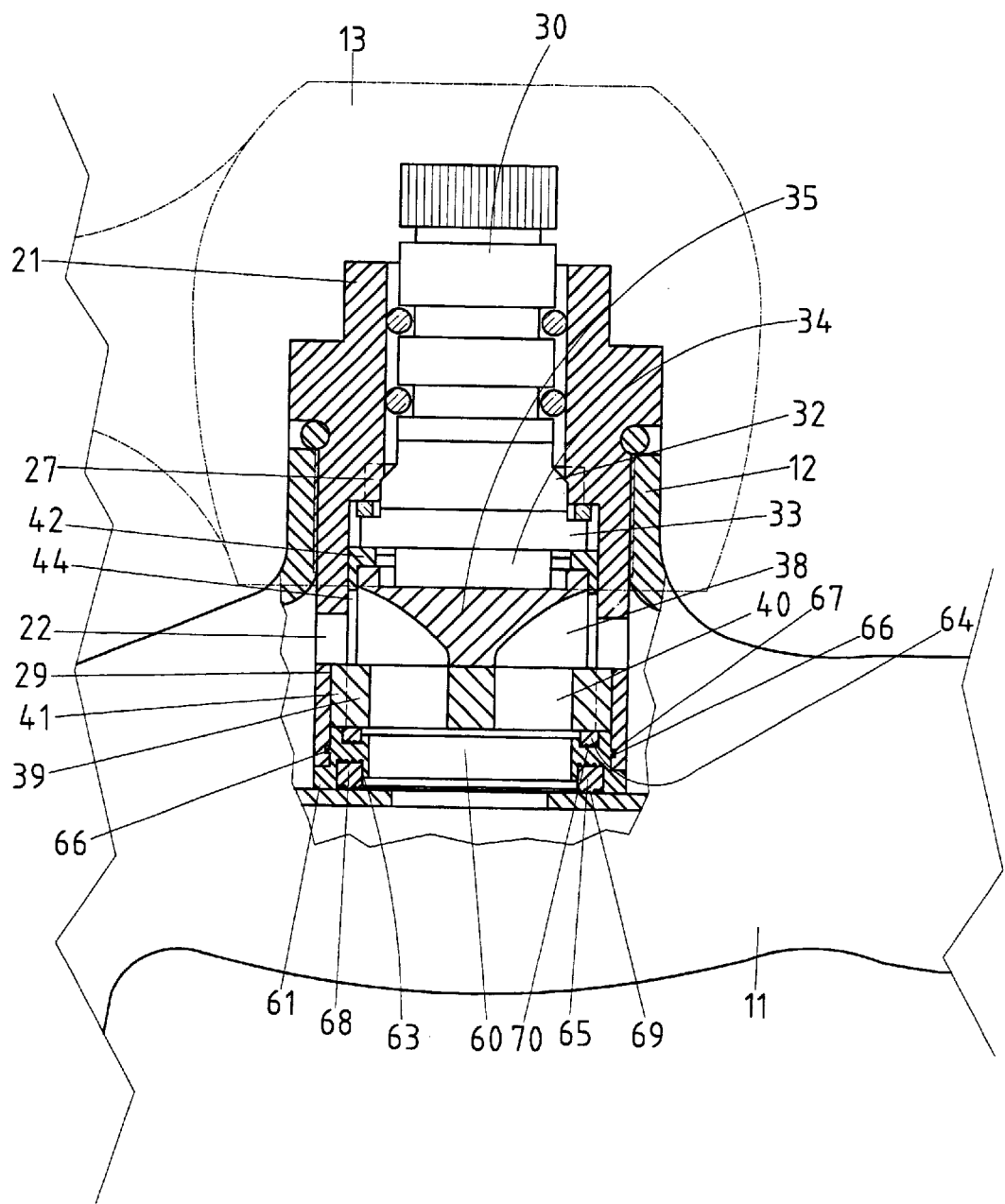
FIG. 7 shows a sectional schematic view of the water stopping seat of the preferred embodiment of the present invention in use.

As shown in FIGS. 5, 6, and 7, a water stopping seat 60 of the preferred embodiment of the present invention is located under the stationary valve block 39 of the cylindrical valve body 21 and is provided in the periphery of a bottom thereof with a protruded edge 61. The water stopping seat 60 is further provided in the top thereof with a top annular recess 62, and in the bottom thereof with a bottom annular recess 63, which receive respectively a washer 64 of the stationary valve block 39 and a washer 65 of the circular surface 11 of the faucet 10. The present invention is characterized by the water stopping seat 60 which is provided with a plurality of symmetrical retaining edges 66, which are retained in a floating fashion in the annular recesses 67 of the cylindrical valve body 21. The outer wall surface is higher than the inner wall surface of the top annular recess 62. The outer wall surface of the bottom annular recess 63 is higher than the inner wall surface. The bottom annular recess 63 is provided with a plurality of fine annular ribs 68. The washer 65 is provided in the underside with a plurality of annular protruded edges 69 which are rested on the circular surface 11 of the faucet 10. The washer 64 is provided in the bottom with a plurality of annular protruded edges 70 which are received in the top annular recess 62. The water stopping seat 60 is thus assembled in a floating manner to prolong the service life span of the washers 64 and 65, which are not susceptible to deformation.

What is claimed is:

1. A water stopping seat of a ceramic control valve of a faucet, said water stopping seat being disposed under a stationary valve block of a cylindrical valve body of the ceramic control valve and provided in the periphery of a bottom thereof with a protruded edge, said water stopping seat further provided in the top thereof with a top annular recess, and in the bottom thereof with a bottom annular recess, said top annular recess serving to receive a washer of the stationary valve block, said annular bottom recess serving to receive a washer of a circular surface of the faucet; wherein said water stopping seat is provided with a plurality of retaining edges, which are retained in a floating fashion in annular recesses of the cylindrical valve body of the ceramic control valve such that the outer wall surface of said top annular recess is higher than the inner wall surface of said top annular recess, and that the outer wall surface of said bottom annular recess is higher than the inner wall surface of said bottom annular recess, said bottom annular recess being provided with a plurality of fine annular ribs, said washer of the circular surface of the faucet provided with a plurality of annular protruded edges which are rested on the circular surface, said washer of the stationary valve block provided with a plurality of annular protruded edges which are received in said top annular recess.

* * * * *